United States Patent
John et al.

(10) Patent No.: US 9,021,118 B2
(45) Date of Patent: Apr. 28, 2015

(54) SYSTEM AND METHOD FOR DISPLAYING A TAG HISTORY OF A MEDIA EVENT

(75) Inventors: Ajita John, Holmdel, NJ (US); Shreeharsh Kelkar, Summit, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 320 days.

(21) Appl. No.: 12/847,977

(22) Filed: Jul. 30, 2010

(65) Prior Publication Data

US 2012/0030368 A1 Feb. 2, 2012

(51) Int. Cl.
| G06F 15/16 | (2006.01) |
| H04N 21/231 | (2011.01) |
| G06F 17/30 | (2006.01) |
| G06F 17/21 | (2006.01) |
| H04N 21/845 | (2011.01) |

(52) U.S. Cl.
CPC .... *H04N 21/23109* (2013.01); *G06F 17/30038* (2013.01); *G06F 17/30056* (2013.01); *G06F 17/214* (2013.01); *G06F 17/218* (2013.01); *G06F 17/30864* (2013.01); *H04N 21/8453* (2013.01)

(58) Field of Classification Search
CPC ............... G06F 17/30038; G06F 17/30056
USPC ................... 709/231; 715/230, 723
See application file for complete search history.

(56) References Cited

U.S. PATENT DOCUMENTS

| 7,539,659 | B2 * | 5/2009 | Wong et al. ............... 706/62 |
| 8,391,455 | B2 * | 3/2013 | Kelkar et al. ............ 379/202.01 |
| 2007/0250901 | A1 * | 10/2007 | McIntire et al. ............ 725/146 |
| 2008/0003964 | A1 * | 1/2008 | Alperin et al. ............ 455/185.1 |
| 2008/0075244 | A1 * | 3/2008 | Hale et al. ............ 379/88.13 |
| 2009/0055742 | A1 * | 2/2009 | Nordhagen ............ 715/716 |
| 2009/0094520 | A1 * | 4/2009 | Kulas ............ 715/723 |
| 2009/0299725 | A1 * | 12/2009 | Grigsby et al. ............ 704/2 |
| 2010/0070643 | A1 * | 3/2010 | Puranik et al. ............ 709/231 |
| 2010/0070860 | A1 | 3/2010 | Alkov et al. |

(Continued)

FOREIGN PATENT DOCUMENTS

EP          2136301          12/2009

OTHER PUBLICATIONS

B.L. Tseng, C.-Y. Lin, and J.R. Smith, "Using MPEG-7 and MPEG-21 for personalizing video," *IEEE Multimedia*, vol. 11, No. 1, pp. 42-53, 2004.

(Continued)

*Primary Examiner* — Richard G Keehn

(57) ABSTRACT

Disclosed are systems, methods, and non-transitory computer-readable storage media for presenting temporal aspects of a group of tags associated with a primary media stream. The temporal aspects of the tags are presented by obtaining temporal metadata for the tags, generating a secondary media stream for the media event based on the temporal metadata, and delivering the secondary media stream to a user terminal, such that the secondary media stream is navigable at the user terminal. The secondary media stream includes a sequence of representations of the tags visually depicting a relative significance of the tags during different intervals of times for the media event. Changes in the relative significance of the tags between successive representations can be depicted by changing at least one of a size, position, a shape, and a color of indicia associated with the tags.

20 Claims, 4 Drawing Sheets

(56) References Cited

U.S. PATENT DOCUMENTS

| | | | |
|---|---|---|---|
| 2010/0141655 A1* | 6/2010 | Belinsky et al. | 345/440 |
| 2011/0029873 A1* | 2/2011 | Eseanu et al. | 715/719 |
| 2011/0066949 A1* | 3/2011 | DeLuca et al. | 715/744 |
| 2012/0180083 A1* | 7/2012 | Marcus | 725/32 |

OTHER PUBLICATIONS

R. Klamma, M. Spaniol, and D. Renzel, "Community-Aware Semantic Multimedia Tagging—From Folksonomies to Commsonomies," Proceedings of I-Media '07 and I-Semantics '07, pp. 163-171, 2007.

* cited by examiner

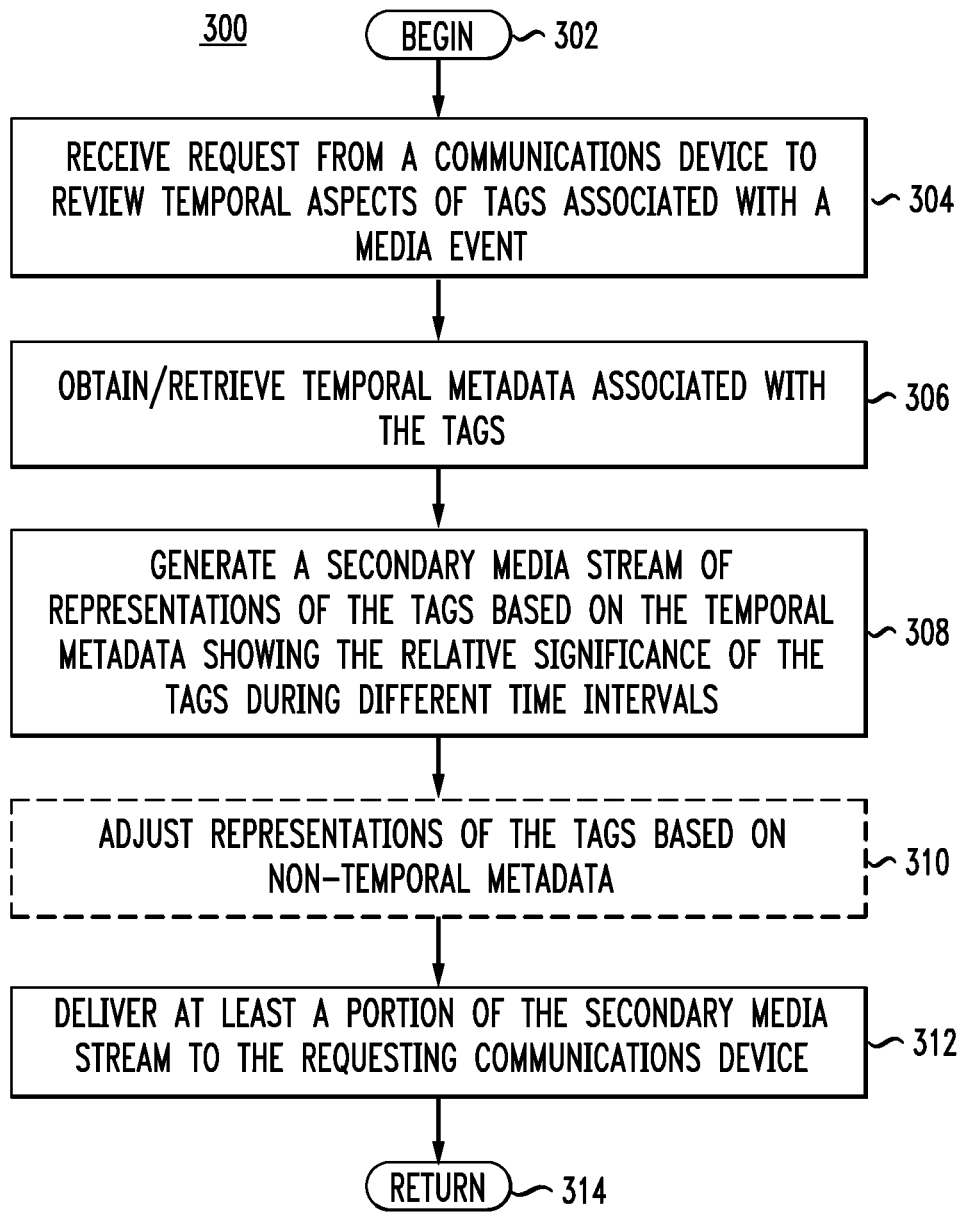

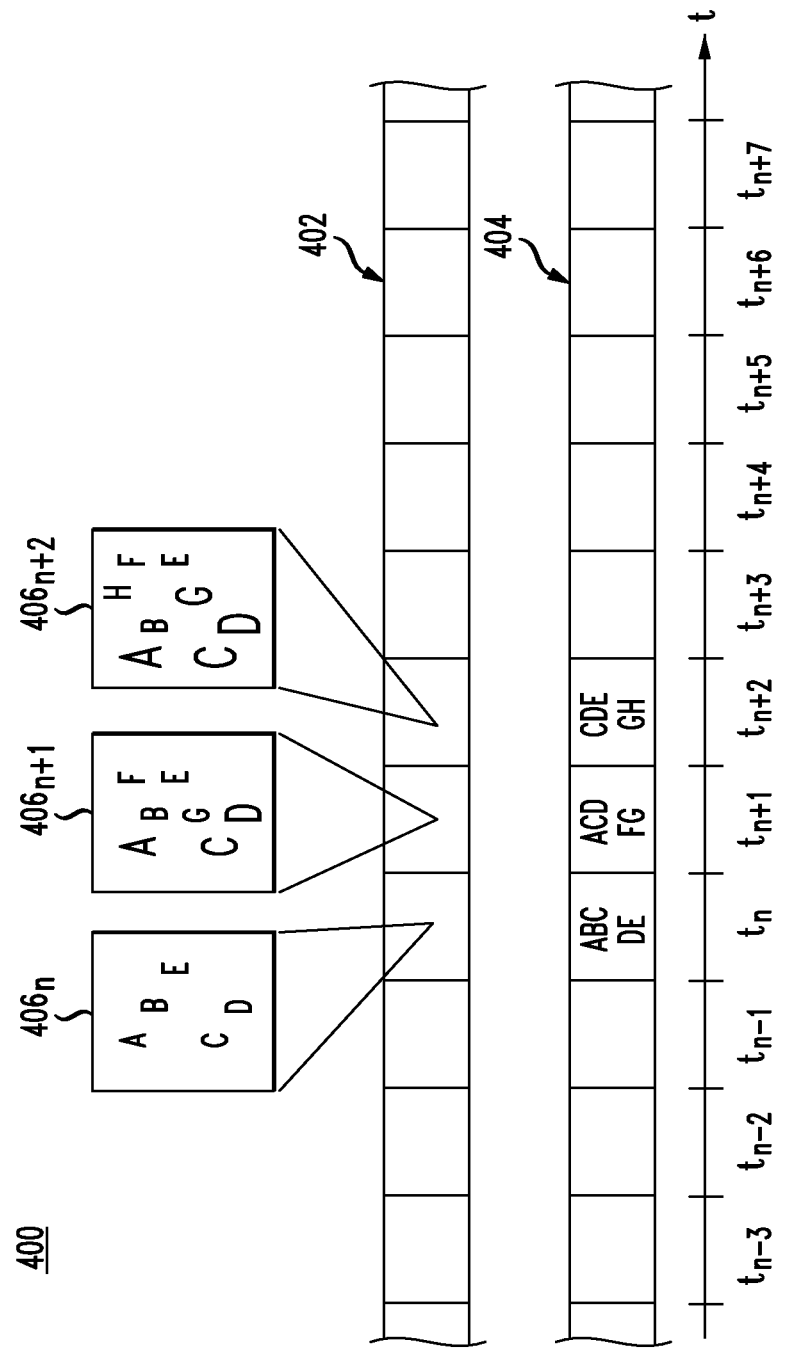

SYSTEM AND METHOD FOR DISPLAYING A TAG HISTORY OF A MEDIA EVENT

BACKGROUND

1. Technical Field

The present disclosure relates to tagging of media event and more specifically to systems and methods for displaying tag histories of media events.

2. Introduction

A conventional tag cloud or word cloud (or weighted list in visual design) generally provides a visual depiction of user-generated tags, metadata, or content of a web site or other on-line content. Tags in a tag cloud are usually single words and are normally listed alphabetically, and the importance of a tag is shown with font size or color. Thus, it is possible to find a tag alphabetically and by popularity. The tags can also provide hyperlinks that lead to content, at the web site or other web sites, which is associated with the tags.

Tag clouds can also be used to provide a summary of tags for other types of media events, such a teleconferences, video conferences, and television broadcasts, in real time or thereafter. For example, during a concert, users viewing the event can tag portions of the concert with tags such as "nice guitar solo", "Hotel California", or "MP3 available at iTunes". Thereafter, the tags can be summarized as a tag cloud. Accordingly, a user can thereafter view the tag cloud and obtain a summary of the media event based on other users' tagging and the frequency and/or importance of the tags to these other users. Unfortunately, as tag clouds for media events are an offshoot of tag clouds for web sites and other on-line content, such tag clouds are typically limited to displaying an overall summary of tags associated with a media event.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for presenting temporal aspects of a group of tags associated with a primary media stream. In one embodiment, a tag is explicitly attached to one or more specific portion of a live or recorded media event, such as an instant or a segment. Tags can also be attached to more than one media event or media stream. The temporal aspect of the tags are presented by obtaining temporal metadata for the group of tags, generating a secondary media stream for the media event, and delivering at least a portion of the secondary media stream to at least one user terminal, where a flow of the delivered portion of the secondary media stream is configured to be adjustable and/or navigable at the user terminal. In the present disclosure, the secondary media stream includes of a sequence of representations of at least a portion of the group of tags based at least on the temporal metadata. Further, each representation visually depicts a relative significance of the portion of the group of tags during an interval of time of the media event. Changes in the relative significance of one or more of the group of tags between successive ones of the sequence of representations are depicted by changing at least one of a size, position, a shape, and a color of one or more indicia associated with the one or more of the group of tags. The temporal metadata and tags are different from direct inter-user communications, such as the text of an instant messaging session. However, if the media event is an instant messaging session, then the system can use non-message tags which describe the instant messaging session and non-message temporal and/or non-temporal metadata when displaying the tag history.

The present disclosure contemplates, in some configurations, delivering a portion of the primary media stream associated with the delivered portion of secondary media stream.

Additionally, the present disclosure contemplates that each of the representations can also be configured to visually depict the relative significance of the group of tags with respect to non-temporal metadata associated with the group of tags. Further, the present disclosure contemplates selecting a portion of the group of tags associated with non-temporal metadata meeting selection criteria and generating and delivering a secondary media stream including only the selected portion of the group of tags. In some configurations, the non-temporal metadata can be selected to identify at least one of group of users and a group of user groups associated with the group of tags. In other configurations, the non-temporal metadata can be selected to identify a group of users associated with the group of tags and an emotion state associated with each of the group of tags.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 is a flowchart of steps in an exemplary method for presenting the temporal aspects of tags associated with online content or a media event to users; and FIG. 4 is a schematic diagram showing an exemplary assembly of a secondary media stream showing the relative significance of tags during different intervals of time of a primary media stream associated with a media event.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As described above, tag clouds can be a useful technique for summarizing the significance of tags associated with online content or a media event. However, while such tag clouds may be used to provide an overall summary of tags associated with the online content or media event, such conventional tag clouds for media events generally fail to capture the temporal aspects of the tags. For example, if a user joins a media event and views an existing tag cloud, there is generally no mechanism for displaying the temporal development or temporal aspects of the tag cloud to the user.

The present disclosure addresses the need in the art for presenting users the temporal aspects of tags of a media event. In particular, a system, method and non-transitory computer-readable media are disclosed herein for presenting users the temporal aspects of tags of a media event by generating a media stream having a sequence of representations, where each of the representations includes a visual depiction of the relative significance of the tags associated with the media event during different intervals of time.

In operation, a system receives tags associated with a media event, the tags having metadata including a time stamp relative to the media event. The tags can be generated automatically based on an analysis of the media event and/or the tags can be generated manually by participants of the media event. Participants can include active participants as well as passive viewers or consumers of a media event. For example, participants can include callers in a conference call as well as viewers of a broadcast football game. The system organizes the tags by time stamp and generates a summary of the tags based on their time stamp. For example, a tag summary can be an animation of the tags that summarizes the media through growing and shrinking tagged areas, or growing and shrinking textual tags. The system can further organize tags based on other attributes, such as speaker, group of participants, a subject, and so forth. Accordingly, instead of requiring a user to review the media event in its entirety to understand its contents, a user can instead review the history of the tagging. From that, the user can access portions of the conference documents and/or other data of interest to the user. An exemplary environment supporting tagging for media events is illustrated with respect to FIG. 1.

Figure 1:
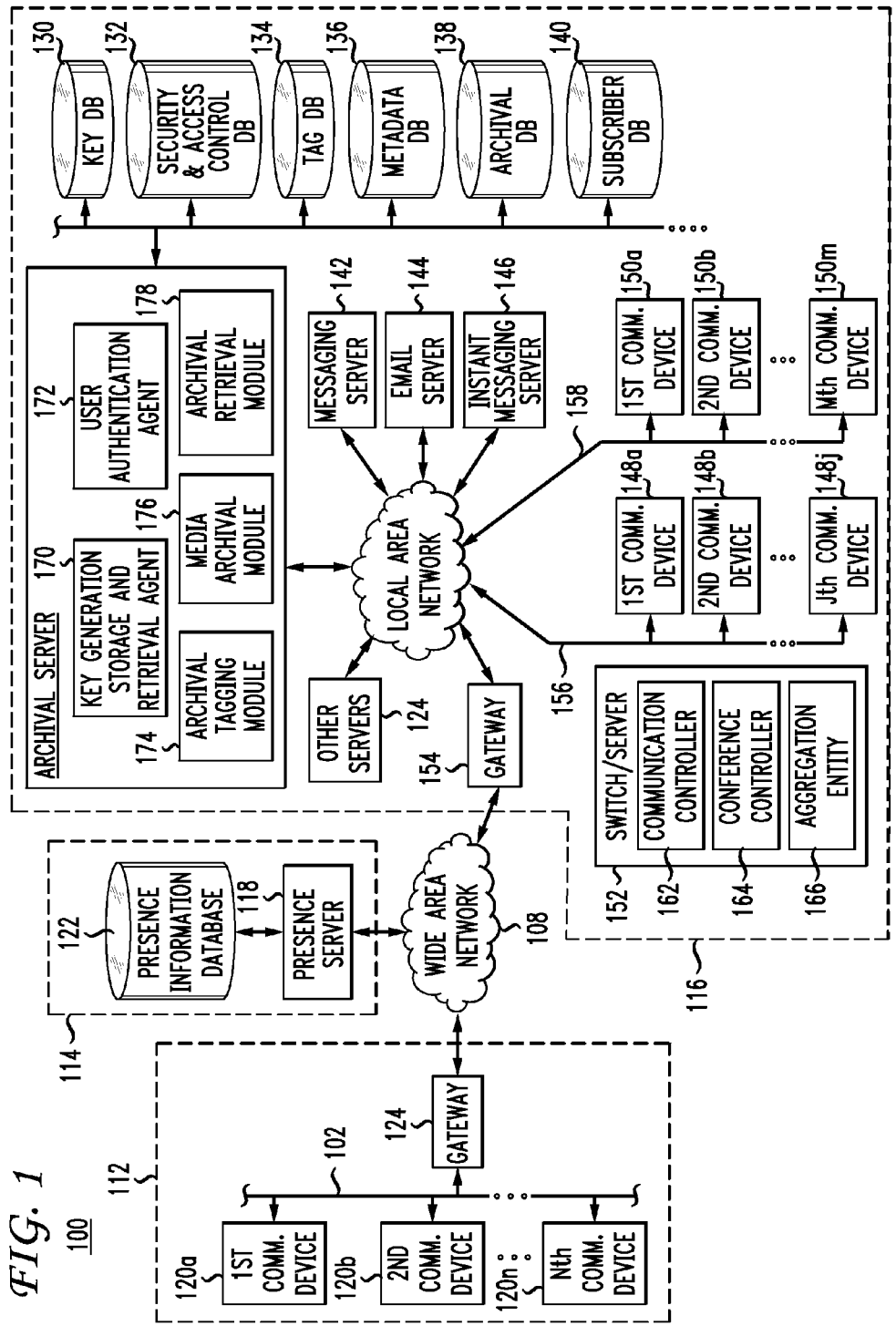
FIG. 1 is a block diagram of an exemplary communications architecture for supporting tagging during a media event.

FIG. 1 is a block diagram of an exemplary communications architecture 100 for supporting tagging during a media event. Although communications architecture 100 will be described below as including specific number and types of components, this is for illustrative purposes. Rather, the present disclosure contemplates the use of other architectures, including architectures with more or less components than shown in FIG. 1.

As shown in FIG. 1, first and second enterprise Local Area Networks (LANs) 102 and 104 and presence service 114 are interconnected by one or more Wide Area private and/or public Network(s) (WANs) 108. The first and second LANs 102 and 104 correspond, respectively to first and second enterprise networks 112 and 116.

As used herein, the term "enterprise network" refers to a communications network associated and/or controlled by an entity. For example, enterprise networks 112 and 116 can be a communications network managed and operated by a telephony network operator, a cable network operator, a satellite communications network operator, or a broadband network operator, to name a few.

The first enterprise network 112 includes communication devices 120a, 120b . . . 120n (collectively "120") and a gateway 124 interconnected by the LAN 102. The first enterprise network 112 may include other components depending on the application, such as a switch and/or server (not shown) to control, route, and configure incoming and outgoing contacts.

The second enterprise network 116 includes a gateway 124, an archival server 128 maintaining and accessing a key database 130, a security and access control database 132, a tag database 134, a metadata database 136, an archival database 138, and a subscriber database 140, a messaging server 142, an email server 144, an instant messaging server 146, communication devices 148a, 148b, . . . , 148j (collectively "148"), communication devices 150a, 150b, . . . , 150m (collectively "150"), a switch/server 152, and other servers 154. The two enterprise networks may constitute communications networks of two different enterprises or different portions a network of single enterprise.

A presence service 114, which can be operated by the enterprise associated with one of networks 104 and 108, includes a presence server 118 and associated presence information database 122. The presence server 118 and presence information database 122 collectively track the presence and/or availability of subscribers and provide, to requesting communication devices, current presence information respecting selected enterprise subscribers.

As used herein, a "subscriber" refers to a person who is serviced by, registered or subscribed with, or otherwise affiliated with an enterprise network, and "presence information" refers to any information associated with a network node and/or endpoint device, such as a communication device, that is in turn associated with a person or identity. Examples of presence information include registration information, information regarding the accessibility of the endpoint device, the endpoint's telephone number or address (in the case of telephony devices), the endpoint's network identifier or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The WAN(s) can be any distributed network, such as packet-switched or circuit-switched networks, to name a few. In one configuration, the WANs 108 include a circuit-switched network, such as the Public Switch Telephone Network or PSTN, and a packet-switched network, such as the Internet. In another configuration, WAN 108 includes only one or more packet-switched networks, such as the Internet.

The gateways 124 can be any suitable device for controlling ingress to and egress from the corresponding LAN. The gateways are positioned logically between the other components in the corresponding enterprises and the WAN 108 to process communications passing between the appropriate switch/server and the second network. The gateway 124 typically includes an electronic repeater functionality that intercepts and steers electrical signals from the WAN to the corresponding LAN and vice versa and provides code and protocol conversion. Additionally, the gateway can perform various security functions, such as network address translation, and set up and use secure tunnels to provide virtual private network capabilities. In some protocols, the gateway bridges conferences to other networks, communications protocols, and multimedia formats.

In one configuration, the communication devices 120, 148, and 150 can be packet-switched stations or communication devices, such as IP hardphones, IP softphones, Personal Digital Assistants or PDAs, Personal Computers or PCs, laptops, packet-based video phones and conferencing units, packet-based voice messaging and response units, peer-to-peer based communication devices, and packet-based traditional computer telephony adjuncts.

In some configurations, at least some of communications devices 120, 148, and 150 can be circuit-switched and/or time-division multiplexing (TDM) devices. As will be appreciated, these circuit-switched communications devices are normally plugged into a Tip ring interface that causes electronic signals from the circuit-switched communications devices to be placed onto a TDM bus (not shown). Each of the circuit-switched communications devices corresponds to one of a set of internal (Direct-Inward-Dial) extensions on its controlling switch/server. The controlling switch/server can direct incoming contacts to and receive outgoing contacts from these extensions in a conventional manner. The circuit-switched communications devices can include, for example, wired and wireless telephones, PDAs, video phones and conferencing units, voice messaging and response units, and traditional computer telephony adjuncts. Although not shown, the first enterprise network 112 can also include circuit-switched or TDM communication devices, depending on the application.

Although the communication devices 120, 148, and 150 are shown in FIG. 1 as being internal to the enterprises 112 and 116, these enterprises can further be in communication with external communication devices of subscribers and non-subscribers. An "external" communication device is not controlled by an enterprise switch/server (e.g., does not have an extension serviced by the switch/server) while an "internal" device is controlled by an enterprise switch/server.

The communication devices in the first and second enterprise networks 112 and 116 can natively support streaming IP media to two or more consumers of the stream. The devices can be locally controlled in the device (e.g., point-to-point) or by the gateway 124 or remotely controlled by the communication controller 162 in the switch/server 152. When the communication devices are locally controlled, the local communication controller should support receiving instructions from other communication controllers specifying that the media stream should be sent to a specific address for archival. If no other communication controller is involved, the local communication controller should support sending the media stream to an archival address.

The archival server 128 maintains and accesses the various associated databases. This functionality and the contents of the various databases are discussed in more detail below.

The messaging server 142, email server 144, and instant messaging server 146 are application servers providing specific services to enterprise subscribers. As will be appreciated, the messaging server 142 maintains voicemail data structures for each subscriber, permitting the subscriber to receive voice messages from contactors; the email server 144 provides electronic mail functionality to subscribers; and the instant messaging server 146 provides instant messaging functionality to subscribers.

The switch/server 152 directs communications, such as incoming Voice over IP or VoIP and telephone calls, in the enterprise network. The terms "switch", "server", and "switch and/or server" as used herein should be understood to include a PBX, an ACD, an enterprise switch, an enterprise server, or other type of telecommunications system switch or server, as well as other types of processor-based communication control devices such as media servers, computers, adjuncts, etc. The switch/media server can be any architecture for directing contacts to one or more communication devices.

The switch/server 152 can be a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Exemplary control programs include a communication controller 162 to direct, control, and configure incoming and outgoing contacts, a conference controller 164 to set up and configure multi-party conference calls, and an aggregation entity 166 to provide to the archival server 128 plural media streams from multiple endpoints involved in a common session. The switch/server can include a network interface card to provide services to the associated internal enterprise communication devices.

The switch/server 152 can be connected via a group of trunks (not shown) (which may be for example Primary Rate Interface, Basic Rate Interface, Internet Protocol, H.323 and SIP trunks) to the WAN 108 and via link(s) 156 and 158, respectively, to communications devices 148 and communications devices 150, respectively.

Other servers 154 can include a variety of servers, depending on the application. For example, other servers 154 can include proxy servers that perform name resolution under the Session Initiation Protocol or SIP or the H.323 protocol, a domain name server that acts as a Domain Naming System or DNS resolver, a TFTP server 334 that effects file transfers, such as executable images and configuration information, to routers, switches, communication devices, and other components, a fax server, ENUM server for resolving address resolution, and mobility server handling network handover, and multi-network domain handling.

The systems and methods of the present disclosure do not require any particular type of information transport medium or protocol between switch/server and stations and/or between the first and second switches/servers. That is, the systems and methods described herein can be implemented with any desired type of transport medium as well as combinations of different types of transport media.

Although the present disclosure may be described at times with reference to a client-server architecture, it is to be understood that the present disclosure also applies to other network architectures. For example, the present disclosure applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Moreover, the present disclosure does not require a specific Internet Protocol Telephony (IPT) protocol. Additionally, the principles disclosed herein do not require the presence of packet- or circuit-switched networks.

In system 100, the archival server 128 can include a number of computational components. For example, as shown in FIG. 1, these components can include the key generation, storage, and retrieval agent 170, user authentication agent 172, archival tagging module 174, media archival module 172, and archival retrieval module 178.

The key generation, storage, and retrieval agent 170 generates keys for storing selected information in encrypted form. The keys are normally pointers to the stored content and are stored in the key database 130 and are organized to form indices to the stored archives. The keys are preferably unique. Although the keys are shown as being generated by the archival server 128, they could also be generated by the communication controller 162.

The user authentication agent 172, using subscriber profiles in the security and access control database 132, authenticates subscribers and, if successfully authenticated, determines what stored information (e.g., tags, metadata, and archives) the subscriber is authorized to have access to. Authorization can be done by any suitable technique, including username, personal identification number, digital certificate, symmetric keys, asymmetric keys, and the like.

The media archival module 176 stores activity-related or archival information or data in the archival database 138. Such information or data includes all or selected portions of communications, and all or selected portions of documents. In one implementation, voice streams (and video streams) are stored, archived, tagged, and available for future retrieval. The module 176 receives media streams for media events and stores these media stream. In some configurations, the media streams can be received in encrypted form or ciphertext. The media streams can be stored using mass storage technology. For example, mass storage technologies such as digital video recorder (DVR) or video on demand (VOD) technologies. The media stream can be indexed in the archival database 138 using the keys in the key database 130. The media can then be stored in an encrypted or unencrypted form.

The archives can be stored in the archival database 138 in any number of formats, including proprietary and non-proprietary formants, and using any means for compressing or storing media for digital storage or communication. For example the archives can be stored using an MPEG format (or any variants thereof) or Microsoft Corporation's Windows™ media file format. The archival database 138 can alternatively be a flat file/directory structure with an index scheme (e.g., an index file or directory structure based on subscriber identifier (e.g., electronic address), date stamp, time stamp, or unique identifier specified at the time of recording by the subscriber or another entity).

The archival tagging module 174 receives data tags and the unique archival key and creates search and relevance tags for the archived information. As used herein, tags are a type of metadata that is descriptive of the archived information. As will be appreciated, "metadata" is data that describes data objects. Tags typically are a code or set of characters inserted into a file or data structure indicating how the corresponding stored information is to be interpreted. The tags can be the form of eXtensible MarkUp Language (XML) or some other markup language. The tagging module 174 allows for configuration of user permissions to the databases or to specific subsets of archives and associated metadata, allows users to retrieve and view specific metadata elements that are non-modifiable, such as date stamp, a time stamp, recording length, etc.; allows users to enter a specific set of comma-delimited tags that become part of the metadata associated with a particular archive index entry, allows users to retrieve, view and update specific data elements that are modifiable (e.g., the tags previously entered), and maintains an index of tags, also referred to as a tag cloud (discussed below), that represents the unique subset of all tags specified by a user or group of users against any number of archive files.

Data tags include metadata descriptive of an activity, such as related to party (e.g., identities (name and/or electronic address) of parties to the communication, etc.), time (e.g., a date stamp and/or time stamp associated with a communication, a duration of the communication, etc.), form of recording of the activity (e.g., format of the recording, identifier associated with the recording (e.g., a unique identifier provided by the subscriber), etc.), and activity context (e.g., a reason for the communication, topics discussed (e.g., the keywords identified by the user agent 160), activities of each party prior and/or subsequent to and/or during the conversation (e.g., as determined by the user agent 160 by monitoring the computational operations of its corresponding communication device), and threading (whether the recorded activity was related to a previous activity)). The data tags may be obtained from other computational components, from the text of the communication, and/or from the subscriber(s). When received from the subscriber, the tags are a type of meta-tag.

The system can generate search and relevance tags from the metadata. The archival tagging module 174 normally includes an engine that refines and filters the data tags to produce the search and relevance tags. Factors used in search and relevance tag generation include a selected set of enterprise tags (e.g., tags selected by enterprise management), type of communication, context of communication, time stamp of communication, the level of order relationship (e.g., use first, second, . . . $n^{th}$ order relationships to describe the degree of relevance of tags), frequency of topic, breadth of communication on the topic, and recency of topical communication. Enterprise tags are tags mandated by enterprise management to provide coherence to the search engine. For example, the system can map data tags to the enterprise tags to avoid multiple tags referring to the same topic. This approach can enhance topical search accuracy as the search terms for a given topic are standard. The system will automatically build more enterprise tags for itself as users enter topics in their queries for information not already embodied by an enterprise tag. In this case, the system will create a new enterprise tag based on the topic of the query, build $n^{th}$ order relationships between the topics if multiple topics were entered, and create quickly scannable indexes for the topic(s) for future update and scanning. In one configuration, the user agent 160 provides, from a topical search window, to the subscriber a list of search and relevance tags from which the subscriber may select one or more search terms to be used. Search and relevance tags are stored in the tag database 134 while other metadata, such as data tags and/or date/time stamp data, are stored in a metadata database 136.

Tags can be any keyword or set of keywords, and data tags can be captured as written text or as spoken words translated to written text using an analog-to-digital converter and Speech-To-Text (STT) conversion. Additionally, some data tags (e.g., such as date/time stamp and participant identifiers) may be automatically captured as tags. As noted, the system can present the subscriber with a list of pre-existing or predetermined (e.g., enterprise) tags, from which the subscriber can select one or more tag. For subscriber selected or inputted data tags, the subscriber needs to have access to either a device capable of capturing voice (e.g., a microphone), a keyboard, a mouse, or other human interface device, linked to an interface capable of capturing his or her data tag selection(s). The interface, for example, can be a speech recording/recognition engine, a Web browser, and other software application. The data tags are then transported to the archival server substantially simultaneously with the media.

In one variation, the system collects a group of data tags and transmits the group of data tags periodically or when a threshold quantity of data tags are collected.

In some configurations, tags can be associated with other content related with the media event. That is, a user interface at communications devices 120, 148, or 150 can be configured to provide capabilities for the subscriber to enter tags and any other information during display of the online content or display of the media event. For example, a subscriber could enter information specifying the location of other content associated with the media event. Such an interface can be provided via an HTML web-page being opened by the archival tagging module 174 via the HyperText Transfer Protocol (HTTP) via a locally executed HTML browser. However, the present disclosure contemplates providing other types of interfaces for subscribers to input tags and other information. Thereafter, a user interface at one of communications devices 120, 148, or 150 can be configured to allow the subscriber to access, during viewing of an online content or during a media event, the additional content by selection of an associated tag.

In some configurations, the application that is responsible for interacting with the subscriber during the conversation itself (e.g., to start/control/stop recording and digitizing) prompts the subscriber via the subscriber's communication link to speak a set of data tags and runs the spoken data tags through a speech recognition engine, passing the resulting translated data tags to the metadata database 136 along with other metadata values. This can require incorporating the prompt-upon-call-recording-termination activities into the call recording application and integrating a speech-to-text function into one of two places. The call recording application can parse and translate the data tags, passing them as additional items of metadata to the archival tagging module 174. Alternatively, the call recording application can pass a digitized set of spoken data tags to the tagging module 174 and allow the tagging module 174 to process that stream of audio into keywords and translate them to text, storing them as part of the associated metadata.

The archival retrieval module 178 receives search queries from subscribers for stored information, which may be archives, metadata, search and relevance tags, or fluent persons in a selected topic, performs the search in the corresponding database, and returns the located information to the requesting communication device for presentation to the subscriber. In other words, the module 178 presents users with a list of metadata fields upon which the index can be searched, presents users with the tag cloud (e.g., the collection of all possible unique tags for which that user has permissions), allows the user to specify metadata values or select one or more tags from the user's tag cloud and retrieve from the index a list of all archives whose metadata or tag elements match those specified by the user, allows the user to identify one or more specific archives that he or she wishes to retrieve from a repository, and retrieves the specified archives for transmission/playback to the user. For example, the module 178 can receive a search query and, in response, generate, based on the relevance of the tags associated with archived media, a list of potential archived media satisfying the query in question. The retrieved archived media could be played back as a telephone call or displayed as a file sent to the subscriber, based on preferences and permissions that are enforced on the archival retrieval module 178. The search mechanism can be Web-based, voice-based, text-based, or by some other means.

In a simple configuration, one party in the conversation controls the start-stop of the recording. Depending upon the implementation, the archival tagging module 174 and the archiving retrieval module 178 can have user-based permissions and individualized (user-based) indices into archives that will allow one or more parties to tag a specific archive according to unique and individualized data tags. In other words, the archived media will have two different sets of data tags corresponding to the different subscribers. Either subscriber may later retrieve that archive based on the data tags specified in the metadata fields, either based on individualized or shared (enterprise) tags.

As will be appreciated, multiple media archival servers in a given enterprise can handle media processing and storage. The various databases 130, 132, 134, 136, 138, and 140 may have their data configured according to a relational database architecture, an object oriented database architecture, or configured for access by another type of database architecture. Additionally, the data repository or storage may be simply a collection of one or more data files, wherein the data therein may be ordered or unordered.

Figure 2:
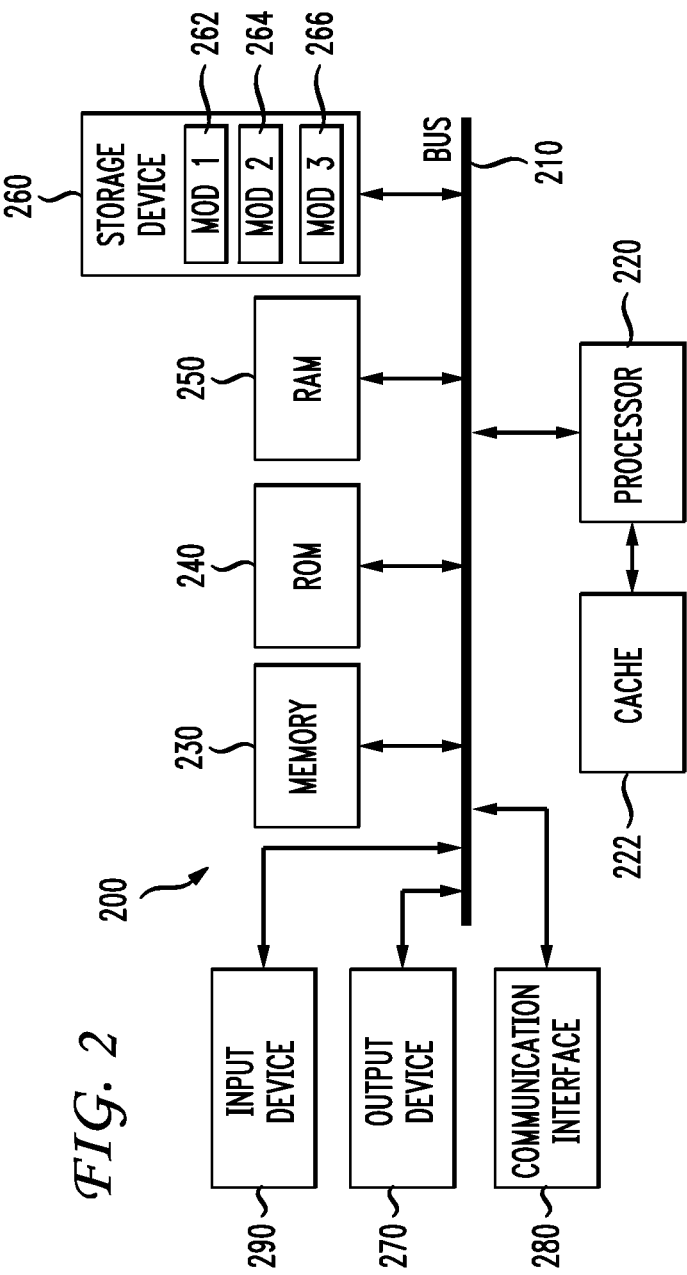
FIG. 2 illustrates a general-purpose computing device for implementing any of the components in FIG. 1.

With reference to FIG. 2, a general-purpose computing device 200 is provided for implementing any of the components in FIG. 1. Although a particular architecture is illustrated for computing device 200, this is for illustrative purposes only. The present disclosure contemplates using one or more computing devices having more or less components than shown in FIG. 2.

As shown in FIG. 2, the computing device 200 includes a processing unit (CPU or processor) 220 and a system bus 210 that couples various system components including the system memory 230 such as read only memory (ROM) 240 and random access memory (RAM) 250 to the processor 220. The system 200 can include a cache 222 of high speed memory connected directly with, in close proximity to, or integrated as part of the processor 220. The system 200 copies data from the memory 230 and/or the storage device 260 to the cache for quick access by the processor 220. In this way, the cache 222 provides a performance boost that avoids processor 220 delays while waiting for data. These and other modules can be configured to control the processor 220 to perform various actions.

Other system memory 230 may be available for use as well. The memory 230 can include multiple different types of memory with different performance characteristics. It can be appreciated that the disclosure may operate on a computing device 200 with more than one processor 220 or on a group or cluster of computing devices networked together to provide greater processing capability. The processor 220 can include any general purpose processor and a hardware module or software module, such as module 1 262, module 2 264, and module 3 266 stored in storage device 260, configured to control the processor 220.

The present disclosure also contemplates processor 220 being implemented as a special-purpose processor where software instructions are incorporated into the actual processor design. Further, the processor 220 can be a completely self-contained computing system, containing multiple cores or processors, a bus, memory controller, cache, etc. Additionally, processor 220 can be a multi-core processor, including symmetric or asymmetric multi-core processor designs.

The system bus 210 may be any of several types of bus structures including a memory bus or memory controller, a peripheral bus, and a local bus using any of a variety of bus architectures. A basic input/output (BIOS) stored in ROM 240 or the like, can provide the basic routine that helps to transfer information between elements within the computing device 200, such as during start-up. The computing device 200 further includes storage devices 260 such as a hard disk drive, a magnetic disk drive, an optical disk drive, tape drive or the like. The storage device 260 can include software modules 262, 264, 266 for controlling the processor 220. Other hardware or software modules are contemplated. The storage device 260 is connected to the system bus 210 by a drive interface. The drives and the associated computer readable storage media provide nonvolatile storage of computer readable instructions, data structures, program modules and other data for the computing device 200. In one aspect, a hardware module that performs a particular function includes the software component stored in a computer-readable medium in connection with the necessary hardware components, such as the processor 220, bus 210, display 270, and so forth, to carry out the function. The basic components are known to those of skill in the art and appropriate variations are contemplated depending on the type of device, such as whether the device 200 is a small, handheld computing device, a desktop computer, or a computer server.

Although the exemplary embodiment described herein employs the hard disk 260, it should be appreciated by those skilled in the art that other types of computer readable media which can store data that are accessible by a computer, such as magnetic cassettes, flash memory cards, digital versatile disks, cartridges, random access memories (RAM) 250, read only memory (ROM) 240, a cable or wireless signal containing a bit stream and the like, may also be used in the exemplary operating environment. Computer-readable storage media expressly exclude non-tangible media for carrying energy, carrier signals, electromagnetic waves, and signals per se.

To enable user interaction with the computing device 200, an input device 290 represents any number of input mechanisms, such as a microphone for speech, a touch-sensitive screen for gesture or graphical input, keyboard, mouse, motion input, speech and so forth. An output device 270 can also be one or more of a number of output mechanisms known to those of skill in the art. In some instances, multimodal systems enable a user to provide multiple types of input to communicate with the computing device 200. The communications interface 280 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 200 shown in FIG. 2 can practice all or part of the recited methods, can be a part of the recited systems, and/or can operate according to instructions in the recited non-transitory computer-readable storage media. Such logical operations can be implemented as modules configured to control the processor 220 to perform particular functions according to the programming of the module. For example, FIG. 2 illustrates three modules Mod1 262, Mod2 264 and Mod3 266, which are modules configured to control the processor 220. These modules may be stored on the storage device 260 and loaded into RAM 250 or memory 230 at runtime or may be stored as would be known in the art in other computer-readable memory locations.

Having disclosed some basic system components, the disclosure now turns to the exemplary method embodiment shown in FIG. 3. For the sake of clarity, the method is discussed in terms of an exemplary system such as is shown in FIGS. 1 and 2 configured to practice the method.

FIG. 3 is a flowchart of steps in an exemplary method 300 for presenting the temporal aspects of tags associated with online content or a media event to users. Method 300 begins at step 302 and proceeds to step 304. A step 304, the system receives a request from a user terminal to review the temporal aspects (i.e., the development over time) of the tags associated with a media event. For example, the archival retrieval module 178 can receive a request to present the tags of a media event associated with an interval of time. The user can generate the request in response to commands entered at a user terminal, such as one of communications device 120, 148, or 150 or another communications device or terminal. Such a request can include displaying the evolution or development of the tags during the media event from the beginning of the media event. However, in other configurations, the request can specify displaying the evolution (forwards or backwards) of the tags.

Responsive to the request at step 304, the temporal metadata associated with the tags for a media event is obtained or retrieved at step 306. As used herein, the term "temporal metadata" means any data that identifies any type of information that identifies date and/or time information associated with a tag, such as a date/time stamp indicating when a tag was submitted by a subscriber or other participating user. Therefore, in response to a request from a user terminal, the archival retrieval module 178 can retrieve temporal information associated with a media event of interest from one or more sources. For example, in some configurations, date stamp and/or time stamp information can be retrieved from metadata database 136. In other configurations, the temporal information can be retrieved from the archival database 138. For example, the date stamp or time stamp information can be retrieved from the index information in database 138.

After the temporal metadata is obtained or retrieved at step 306, a secondary media stream for the media event can be generated at step 308. In particular a stream of representations of the tags can be generated for the media event, where each representation shows the relative significance of each of the tags during one interval of time. This is conceptually illustrated with respect to FIG. 4.

FIG. 4 is a schematic diagram 400 showing an exemplary assembly of a secondary media stream 402 showing the relative significance of tags during different intervals of time of a primary media stream 404 associated with a media event. As described, a media event can be associated by subscribers or other users with a collection of tags. For example, FIG. 4 illustratively shows tags A, B, C, D, E, F, G, and H being associated with the media event of primary media stream 404. One conventional approach to summarizing the tags for primary media stream would be to generate a conventional tag cloud. That is, indicia are provided for each of tags A-H and adjusted to show the relative significance of the tags A-H in the media event. For example, the size of the indicia for tags A-H can be separately adjusted to indicate the frequency of their occurrence in the media event.

In the present disclosure, rather than providing an overall representation of the tags, a representation of the tags is generated for each period or interval of time ($t_i$) of the media event to show how the importance of each of the tags varies over time. For example, in one possible configuration, the system increases the font size during each time interval corresponding to the number of occurrences of a tag during the respective time interval.

For example, as shown in FIG. 4, a media event can have tagging as follows: (1) during time interval $t_n$, tags A, B, C, D, and E are specified; (2) during time interval $t_{n+1}$, tags A, C, D, F, and G are specified; and (3) during time interval $t_{n+2}$, tags C, D, E, G, and H are specified. As a result, the representations 406$_n$, 406$_{n+1}$, and 406$_{n+2}$, corresponding to the time intervals $t_n$, $t_{n+1}$, and $t_{n+2}$, respectively, are generated, as shown in FIG. 4. For explanatory purposes, FIG. 4 is illustrated with the assumption that tags A-H were not associated with the media event prior to time $t_n$.

As shown in FIG. 4, the representation 406$_n$ shows that during time interval $t_n$, tags A, B, C, D, and E were first provided by participants. Accordingly, the representation 406$_n$ shows these tags as having substantially the same size. Thereafter, during time interval $t_{n+1}$, tags A, C, D, F, and G are provided by users. As a result, the additional instances of tags A, C, and D result in an increase in the font size of tags A, C, and D in representation 406$_{n+1}$, as compared to representation 406$_n$. The lack of additional instances of tags B and E results in no change in font size. Additionally, tags F and G are introduced in representation 406$_{n+1}$. In the next time interval $t_{n+2}$, tags C, D, E, G, and H are provided by users. As a result, the additional instances of tags C, D, E, and G result in an increase in the font size of tags C, D, E, and G in representation 406$_{n+2}$, as compared to representation 406$_{n+1}$. The lack of additional instances of tags A, B, and F results in no change in font size for these tags. Additionally, tag H is introduced in representation 406$_{n+2}$.

In representation 406$_{n+1}$, tags F and G are shown to have approximately the same size as tags B and E. However, the present disclosure also contemplates that while an additional instance of a tag during a subsequent time interval can result in an increase in the font size for the tag, the lack of an instance of an additional tag during a subsequent time interval can result in an decrease in the font size for the tag. For example, in representation 406$_{n+1}$, this would result in tags B and E having a smaller font size as compared to tags B and E in representation 406$_n$. In representation 406$_{n+2}$, this would result in tags A, B, and F having a smaller font size as compared to tags A, B, and F in representation 406$_{n+1}$. Such a configuration would thus allow the user to view not only increases in frequency of tagging over time, but also decreases in frequency of tagging over time.

Alternatively, rather than reducing font size, only tags associated with a time interval can be displayed in a corresponding representation. For example, this would result in tags B and E not being shown in representation 406$_{n+1}$, and tags A, B, and F not being shown in representation 406$_{n+2}$. Further, the present disclosure contemplates that in some configurations, an excluded tag would not be shown in subsequent tags until occurrence of another instance of the excluded tag. For example, tag E would be excluded from representation 406$_{n+1}$ but would be included in representation 406$_{n+2}$.

Although FIG. 4 is described with respect to providing a difference in font size, this is for illustrative purposes only. The present disclosure also contemplates utilizing other techniques to depict the relative significance of the tags during different time intervals. For example, changes in relative significance between successive representations can be shown by changes in color, size, position, font, font style, and/or addition of graphics to the tags, to name a few.

Referring back to FIG. 3, following or in conjunction with step 308, the system can optionally adjust representations in the secondary media stream to depict the relative significance of the tags at step 310, based on non-temporal metadata. For example, the relative significance of the tags in the representations can be adjusted based on a current speaker or current happenings in the media event, a subscriber or group of subscribers associated with the tags. In such a configuration, tags associated with a specific speaker, happening, or group of subscribers or participants can be presented differently than tags associated with a different speaker, happening, or group of participants, even if the tags are the same. For example, in the case of a football game involving two opposing teams, a tag indicating "nice throw", "nice catch", "touchdown!", or "score!" can be provided in different colors, fonts, positions, sizes, etc., . . . , depending on the team the tag is directed to or the group of fans (i.e., user, subscribers, or participants) providing the tag.

In some configurations, the non-temporal metadata can also indicate an emotional state associated with the tags. As used herein, an "emotional state" refers to whether the data submitted by a user during tagging is indicative of positive or negative participant support with respect to some aspect of the media event. For example, a tag may have a negative emotional state if the tag is associated with a negative comment with regards to the speaker(s) or participant(s), the content of the media event, or some other aspect of the media event. Similarly, a tag may have a positive emotional state if the tag is associated with a positive comment with regards to the speaker(s) or participant, the content of the media event, or some other aspect of the media event. For example, in a media event where tags associated with speaker indicate negative and positive support, negative tags can be displayed in a red color and positive tags can be displayed in a green color. In such a configuration, negative and positive tags can be determined based on keywords or other aspects of the tags.

The present disclosure further contemplates utilizing one or more techniques to depict the relative significance, with respect to non-temporal metadata, of the tags during different time intervals. For example, the relative significance can be shown by changes in color, size position, font, font style, and addition of graphics to the tags, to name a few.

Once the secondary media stream is adjusted at step 308 (and optionally at step 310), the system can deliver the secondary media stream to one or more of communications devices 120, 148, or 150 at step 312. In some configurations, the secondary media stream can be provided in any number of formats, including proprietary and non-proprietary formants, and using any means for compressing or storing media for digital storage or communication. For example, the secondary media stream can be an MPEG format (or any variants thereof) or Microsoft Corporation's Windows™ media file format. The secondary media stream can include text, graphics, sound, or any combination thereof. In other configurations, the secondary media stream can be delivered to a communications device as a set of instructions, where the communications devices present tags according to the received instructions. For example, the secondary media stream can be a set of instructions in an HTML or XML format, a scripting language format, or other computer code that can be compiled and/or executed at one of communications devices 120, 148, and 150 natively or using an application.

In the present disclosure, the secondary media stream is provided such that the portion of the secondary media stream being currently presented to a user at the user terminal is navigable at a user terminal. That is, the user can cause the secondary media stream to navigate forwards or backwards in time based on input commands and/or signals. Once the secondary media stream is delivered, the method can end at step 314 and resume previous processing, including repeating method 300.

The present disclosure also contemplates that only a portion of the secondary media stream is delivered to the user terminal. That is, the archival retrieval module 178 can provide portions of the secondary media stream on demand to one of communication devices 120, 148, 150, based on user input. Accordingly, as the user input specifies navigating forward or backward in time, the archival retrieval module 178 delivers the corresponding portions of the secondary media stream.

The present disclosure also contemplates that navigation of the secondary media stream can occur at a slower, faster, or same speed as the media event. As a result, a user can view the evolution of the tags at a different rate or speed as compared to the native speed of the media event. Such a configuration allows the user to view the summary of the media event, as provided, by the tags in a lesser amount of time than is required to view the media event. Further, such a configuration allows the user to navigate through the secondary media stream and more quickly identify and navigate to portions of the media event that are of greater interest to the user.

The present disclosure also contemplates presenting the secondary media stream in conjunction with a primary media stream of the media event. In such a configuration, the archival retrieval module 178 can also deliver to a one of communications devices 120, 148, and 150 portions of the primary media stream corresponding the portions of the secondary media stream being delivered. Accordingly, the user can concurrently view the evolution of the tags and the portions of the media event associated with the tags.

The present disclosure further contemplates that only a subset of the tags may be presented to the user based on some selection criteria. For example, when a secondary media stream is generated a priori, as described above, and it would include all tags associated with the media event. Further, in response to a request from a user at one of communications devices 120, 148, or 150 requesting to view the secondary media stream for a media event, the archival retrieval module 178 delivers the secondary media stream. However, when the request specifies selection criteria, such as types of tags, one or more subscribers, or other data identify a specific subset of the tags, the secondary media stream can be modified prior to delivery. In another example, when a secondary media stream is generated on demand (i.e., when a user request is received), the secondary media stream can be generated by the archival retrieval module to exclude any tags not associated with the selection criteria.

In yet another example, the secondary media stream delivered to communications devices 120, 148, 150 can be configured to allow the user to exclude tags based on selection criteria. For example, if the secondary media stream is delivered to one of communications devices 120, 148, 150 as a set of instructions, the communications device can be configured based on the selection criteria to ignore instructions for presenting tags not associated with the selection criteria.

The present disclosure also contemplates utilizing a bag-of-words approach to generating the series of representations. That is, rather than utilizing the tags literally specified by participants, tags for the series of representations are selected from a finite list of pre-defined tags. Accordingly, when the representations are assembled, the literal tags are used to select from the pre-defined tags. Such a selection can be based on calculating a proximity of a literal tag to each of the pre-defined tags. However, the present disclosure contemplates utilizing other methods for selecting from the pre-defined tags.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   obtaining temporal metadata for a plurality of tags associated with a primary media stream of an event;
   generating, via a processor, a secondary media stream for the event, the secondary media stream comprising a sequence of representations of the plurality of tags based on the temporal metadata, wherein:
   each representation in the sequence of representations comprises a respective tag from the plurality of tags, the each representation corresponding to a respective time interval of the event and the respective tag having at least one occurrence during the respective time interval;
   the each representation in the sequence of representations visually depicts a relative significance of the respective tag with respect to other tags in the plurality of tags during the respective time interval, wherein the relative significance is based on a frequency of occurrence of the respective tag during the respective time interval and non-temporal metadata associated with the respective tag; and
   the sequence of representations visually depicts a fluctuation, over time, of the relative significance of the respective tag with respect to the other tags in the plurality of tags; and
   delivering the secondary media stream to a user terminal, wherein the secondary media stream is configured to be navigable at the user terminal.

2. The method of claim 1, wherein delivering the secondary media stream comprises delivering a portion of the primary media stream, the portion corresponding to the secondary media stream.

3. The method of claim 1, wherein the non-temporal metadata comprises one of a current speaker in the media event, a current happening in the media event, a subscriber associated with the respective tag, an emotional state associated with the respective tag.

4. The method of claim 1, further comprising:
   selecting a portion of the plurality of tags associated with non-temporal metadata based on a selection criterion, to yield a selected portion of the plurality of tags; and
   generating the secondary media stream and delivering the secondary media stream using the selected portion of the plurality of tags.

5. The method of claim 4, wherein the non-temporal metadata is selected to identify one of a user and a plurality of user groups associated with the plurality of tags.

6. The method of claim 4, wherein the non-temporal metadata comprises an emotion state associated with each of the plurality of tags.

7. The method of claim 1, wherein generating the secondary media stream comprises depicting a change in the relative significance of one of the plurality of tags between successive ones of the sequence of representations by changing one of a size, a shape, and a color of an indicium associated with the one of the plurality of tags.

8. A system comprising:
   a processor; and
   a computer-readable storage device storing instructions which, when executed by the processor, cause the processor to perform operations comprising:
   obtaining temporal metadata for a plurality of tags associated with a primary media stream of an event;
   generating, via a processor, a secondary media stream for the event, the secondary media stream comprising a sequence of representations of a first portion of the plurality of tags based on the temporal metadata, wherein:
   each representation in the sequence of representations comprises a respective tag from the plurality of tags, the each representation corresponding to a respective time interval of the event and the respective tag having at least one occurrence during the respective time interval;
   the each representation in the sequence of representations visually depicts a relative significance of the respective tag with respect to other tags in the plurality of tags during the respective time interval, wherein the relative significance is based on a frequency of occurrence of the respective tag during the respective time interval and non-temporal metadata associated with the respective tag; and
   the sequence of representations visually depicts a fluctuation, over time, of the relative significance of the respective tag with respect to the other tags in the plurality of tags; and
   delivering the secondary media stream to a user terminal, wherein the secondary media stream is configured to be adjustable at the user terminal.

9. The system of claim 8, wherein delivering the secondary media stream comprises delivering a portion of the primary media stream, the portion corresponding to the secondary media stream.

10. The system of claim 8, wherein the non-temporal metadata comprises one of a current speaker in the media event, a current happening in the media event, a subscriber associated with the respective tag, an emotional state associated with the respective tag.

11. The system of claim 8, wherein the plurality of tags are associated with non-temporal metadata, and wherein the secondary media stream is generated based on a portion of the plurality of tags meeting a non-temporal metadata selection criterion.

12. The system of claim 11, wherein the non-temporal metadata identifies one of a user and a plurality of user groups associated with the plurality of tags.

13. The system of claim 11, wherein the non-temporal metadata identifies an emotion state associated with each of the plurality of tags.

14. The system of claim 8, wherein generating the secondary media stream comprises depicting changes in the relative significance of the respective tag between successive instances of the respective tag in the sequence of representations using a change in one of a size, a shape, and a color of an indicium associated with the respective tag.

15. A computer-readable storage device storing instructions which, when executed by a processor, cause the processor to perform operations comprising:
   obtaining temporal metadata for a plurality of tags associated with a primary video stream of an event;
   generating, via a processor, a secondary media stream for the event, the secondary media stream comprising a sequence of representations of a first portion of the plurality of tags based on the temporal metadata, wherein:
each representation in the sequence of representations comprises a respective tag from the plurality of tags, the each representation corresponding to a respective time interval of the event and the respective tag having at least one occurrence during the respective time interval;
the each representation in the sequence of representations visually depicts a relative significance of the respective tag with respect to other tags in the plurality of tags during the respective time interval, wherein the relative significance is based on a frequency of occurrence of the respective tag during the respective time interval and non-temporal metadata associated with the respective tag; and
the sequence of representations visually depicts a fluctuation, over time, of the relative significance of the respective tag with respect to the other tags in the plurality of tags; and
delivering the secondary video stream to a user terminal, wherein the secondary media stream is configured to be adjustable at the user terminal.

16. The computer-readable storage device of claim 15, storing additional instructions which, when executed by the processor, cause the processor to perform the operations further comprising delivering a portion of the primary video stream to the user terminal, the portion corresponding to the secondary media stream.

17. The computer-readable storage device of claim 15, wherein the each representation further visually depicts the relative significance of the respective tag with respect to a content associated with the respective tag.

18. The computer-readable storage device of claim 15, storing additional instructions which, when executed by the processor, cause the processor to perform the operations further comprising:
prior to generating the secondary video stream, selecting a portion of the plurality of tags associated with non-temporal metadata based on a selection criterion, to yield a selected portion of the plurality of tags; and
generating the secondary video stream and delivering the secondary video stream using the selected portion of the plurality of tags.

19. The computer-readable storage device of claim 18, wherein generating the secondary video stream comprises depicting a change in the relative significance of the respective tag between successive instances of the respective tag in the sequence of representations by a change in one of a size, a shape, and a color of an indicium associated with the respective tag.

20. The computer-readable storage device of claim 15, wherein the non-temporal metadata comprises one of identifying information for a plurality of users associated with the plurality of tags, identifying information for a plurality of user groups associated with the plurality of tags, and an emotion state associated with the plurality of tags.

* * * * *